W. J. HARVEY.
DEVICE FOR CONCENTRATION OF LIGHT RAYS.
APPLICATION FILED NOV. 20, 1917.
1,367,472.
Patented Feb. 1, 1921.
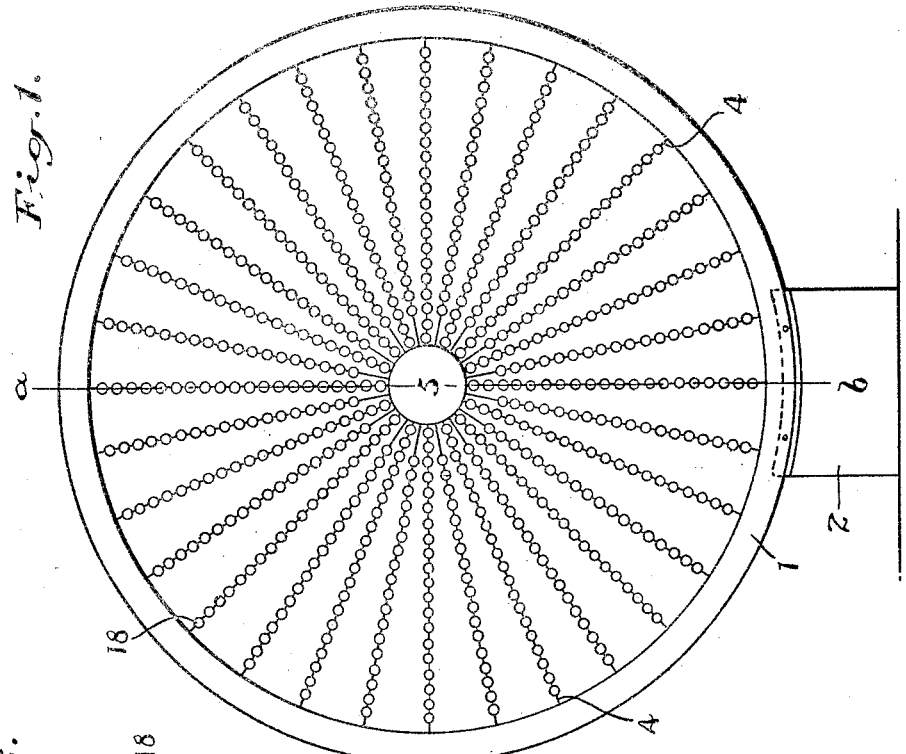
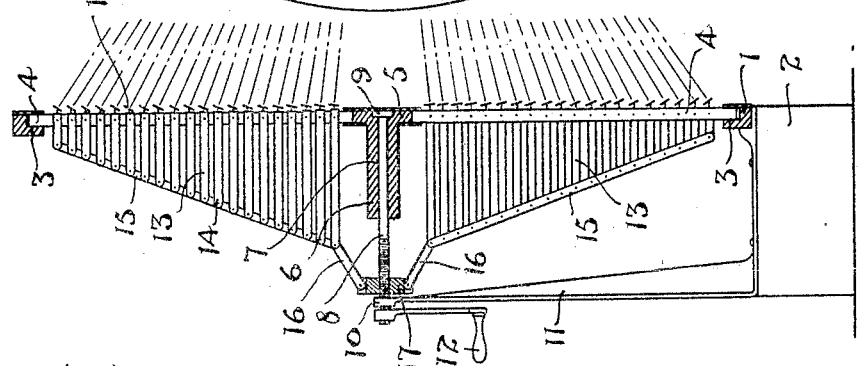
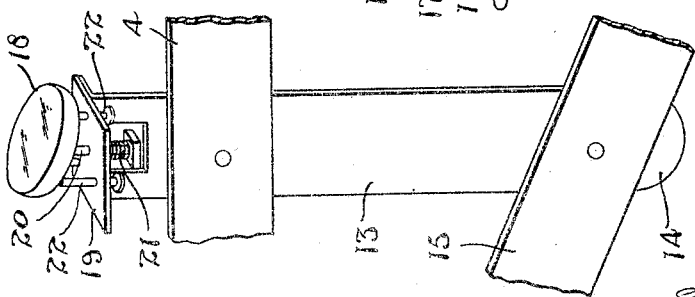
Inventor.
W. J. Harvey

UNITED STATES PATENT OFFICE.

WALTER JAMES HARVEY, OF TORONTO, ONTARIO, CANADA.

DEVICE FOR CONCENTRATION OF LIGHT-RAYS.

1,367,472.  Specification of Letters Patent.  Patented Feb. 1, 1921.

Application filed November 26, 1917. Serial No. 204,060.

*To all whom it may concern:*

Be it known that I, WALTER JAMES HARVEY, a subject of the King of Great Britain, and resident of the city of Toronto, county of York, Province of Ontario, in the Dominion of Canada, have invented certain new and useful Improvements in Devices for Concentration of Light-Rays, described in the following specification and illustrated in the accompanying drawings, that form part of the same.

The principal objects of the invention are to devise an apparatus by means of which rays of light may be gathered and focused effectively in the application of light in therapeutic and ophthalmic work and to devise an apparatus which may be readily operated in focusing the gathered rays of light for various distances for various uses.

The principal feature of the invention consists in the novel construction of device whereby a plurality of individual reflecting members are supported on movable members adapted to be operated in unison and in relatively proportionate movement to effect a concentration of the rays of light upon varying foci and whereby the individual reflecting members may be separately adjusted.

In the accompanying drawings Figure 1 is a front elevational view of the device.

Fig. 2 is a longitudinal mid-sectional view through the line $a-b$ of Fig. 1.

Fig. 3 is an enlarged perspective detail of one of the individual reflectors and its supporting and connecting members.

Referring to the accompanying drawings it will be seen that a ring 1 is rigidly supported upon a base 2 which may be of any suitable design. The ring 1 is formed with a plurality of radial slots 3 on its inner side and in these slots are secured the outer ends of a plurality of radially arranged bars 4.

The inner ends of the bars 4 are secured in a circular member 5 which is provided with a cylindrical-shaped extension 6. The member 5 is formed with a centrally arranged longitudinal hole 7 countersunk at one end in which a spindle 8 is rotatably supported, said spindle having a head 9 resting in the countersunk end of the hole 7. The opposite end of the spindle is supported in a bearing 10 in a bracket 11 supported from the base.

A crank handle 12 is secured to the outer end of the spindle in order to rotate the same.

Each of the bars 4 has pivotally connected thereto a plurality of rods 13. These rods are preferably arranged in gradual diminishing length as they extend outwardly from the center and the ends 14 of said rods are connected together by the link bars 15 which are pivotally secured to said rods.

The inner ends of each of the link bars 15 have pivotally connected thereto link members 16 and the other ends of said links are pivotally secured in radial slots formed in a nut 17 which is threaded upon the spindle 8 between the bearing 10 and the end of the extension 6.

The rotation of the spindle causes the nut to travel thereon and operate the links 16 and through them to swing the multiple sets of rods 13 upon their pivots through the connecting link bars 15.

It will be readily understood that on account of the difference in length of the rods 13 the angularity of these rods will change in a different proportion with the movement of the nut.

Each of the rods 13 is formed with a right angularly arranged head 19 and in this head is slidably mounted a pin 20 to the outer end of which is pivotally secured a small cup 18 which contains a small concaved reflector. Three set screws 22 are threaded in the head 19 and engage the under side of the cup and by adjusting these the reflector may be adjusted to any desirable angle. The cup is held in contact with the set screws by the tension of a coil spring 21 encircling the pin 20 below the head 19 and engaging a nut on the end of said pin.

By adjusting these screws the cup may be tilted to any desirable angle. This adjustment is made in order to focus the cups to direct the rays of light inwardly to a focal point and when so adjusted a different focus may be effected by the manipulation of the rods 13 carrying the reflecting members.

The setting of the cup and the relative length of the rods 13 are figured to a proper relation so that by the swinging of the link bars 15 through the operation of the nut 17 of the links 16 the rods 13 are swung on their pivots on the bars 4, thus changing the focal point of all of the reflector members 18 simultaneously and in proper proportion to focus at different distances.

It will be understood from this description and from the drawing that each of the reflecting members operates to increase the light at the focus and that as a great many of these are arranged upon the surface of the device an enormous quantity of light rays will be concentrated and directed to a common focal point.

Such an apparatus allows of a very wide range in use in therapeutic, opthalmic and other scientific work where concentration of light rays is required and it will be readily seen that by shifting the focus of the various reflectors in relation to the object upon which the light is to be concentrated, many different results can be obtained and different areas covered by the light so concentrated.

The minor details of construction of the device in regard to the actual structure of the rods carrying the reflecting members and other means of individual adjustment may be altered considerably without altering the main feature of the invention.

What I claim as my invention is:—

1. A device for the concentration of light rays, comprising a plurality of rigid radial arms, individual members of graduated lengths pivotally supported at one end, link bars pivotally connected to the graduated ends of said pivotal members, means for operating said link bars to swing said pivotal members upon their pivots, and individual reflecting members secured one to each of said bars.

2. A device for the concentration of light rays, comprising a frame having a plurality of rigid radial supports, rods pivotally arranged upon said supports and formed in gradual decreasing lengths from the center outwardly in their radial arrangement, link bars connecting the graduated ends of said rods, a threaded spindle rotatably mounted in central arrangement in relation to said links bars, a nut traveling on said threaded spindle, link members pivotally connected to said link bars and to said nut and adapted to move said link bars to swing said rods upon their pivots at varying angles, and individual reflectors secured at the pivotal ends of said rods.

3. A device for the concentration of light rays, comprising a frame having a plurality of rigid radial supports, rods pivotally connected to said radial supports, individual reflecting members pivotally and adjustably secured to the pivotal ends of said rods; and means connected to the other ends of said rods for swinging them in unison to concentrate the rays of light reflected from said reflecting members.

4. A device for the concentration of light rays, comprising a rigid frame formed of an outer ring shaped member and a plurality of radially arranged bars connected to a rigid center, said center having a central bearing therein, a spindle rotatably mounted in said central bearing, a nut threaded upon said spindle, a plurality of rods pivotally secured to each of said radial arms and spaced equidistant from each other throughout the length of said arms, said rods being arranged in regular graduated decreasing lengths from the center outwardly, link bars pivotally connecting the outer ends of said rods, means connecting said link bars to said nut, and individual reflecting members secured to the pivotal ends of said rods.

WALTER JAMES HARVEY.